(12) United States Patent
Brice et al.

(10) Patent No.: US 8,936,113 B2
(45) Date of Patent: Jan. 20, 2015

(54) PERCUSSION MOLE AND METHOD OF GEOTHERMAL HEAT EXCHANGE

(75) Inventors: Mark Brice, Kent (GB); Les Brown, Kent (GB)

(73) Assignee: Geo-Mole Limited (GB)

( * ) Notice: Subject to any disclaimer, the term of this patent is extended or adjusted under 35 U.S.C. 154(b) by 642 days.

(21) Appl. No.: 13/254,011

(22) PCT Filed: Mar. 10, 2010

(86) PCT No.: PCT/GB2010/050406
§ 371 (c)(1),
(2), (4) Date: Oct. 5, 2011

(87) PCT Pub. No.: WO2010/103317
PCT Pub. Date: Sep. 16, 2010

(65) Prior Publication Data
US 2012/0097448 A1    Apr. 26, 2012

(30) Foreign Application Priority Data
Mar. 10, 2009    (GB) .................................... 0904101.3

(51) Int. Cl.
*E21B 10/40*    (2006.01)
*E21B 36/00*    (2006.01)
*F24J 3/08*    (2006.01)
*E21B 7/26*    (2006.01)

(52) U.S. Cl.
CPC . *F24J 3/083* (2013.01); *E21B 7/26* (2013.01); *F24J 2003/088* (2013.01); *Y02E 10/125* (2013.01)
USPC ............................. 175/296; 175/389; 166/302

(58) Field of Classification Search
USPC .................... 175/296, 389, 414, 417; 166/302
See application file for complete search history.

(56) References Cited

U.S. PATENT DOCUMENTS

| 3,151,687 A | 10/1964 | Sato |
| 4,958,689 A | 9/1990 | Lee |
| 5,002,137 A | 3/1991 | Dickinson |
| 5,109,932 A | 5/1992 | Bueter |
| 5,161,626 A | 11/1992 | Laffkas |
| 5,253,722 A | 10/1993 | Laffkas |

(Continued)

FOREIGN PATENT DOCUMENTS

| GB | 2058224 A | 4/1981 |
| GB | 2482028 A * | 1/2012 |

(Continued)

OTHER PUBLICATIONS

Glasmedia: Technical Specification Sheet, 4 pages, Sep. 21, 2006.

(Continued)

*Primary Examiner* — Catherine Loikith
(74) *Attorney, Agent, or Firm* — Barnes & Thornburg LLP

(57) ABSTRACT

An apparatus for inserting a ground-loop for a geothermal heat-pump system comprises: a percussion mole (4); a first fluid pipe (5), connected to the mole (4), for conveying a heat-exchange fluid from the heat-pump system into the ground; and a second fluid pipe (6), connected to the mole (4), for returning the heat-exchange fluid to the heat-pump system. One of the first and second fluid pipes (5, 6) comprises an intake pipe for delivering a driving fluid to the mole (4) during insertion of the ground-loop and the other fluid pipe comprises an exhaust pipe for the driving fluid.

14 Claims, 5 Drawing Sheets

(56) References Cited

U.S. PATENT DOCUMENTS

| | | | |
|---|---|---|---|
| 5,623,986 A * | 4/1997 | Wiggs | 165/45 |
| 6,273,201 B1 | 8/2001 | Randa | |
| 8,020,636 B2 * | 9/2011 | Wurm | 175/58 |
| 2005/0061472 A1 * | 3/2005 | Guynn et al. | 165/45 |
| 2005/0139353 A1 | 6/2005 | Johnson | |

FOREIGN PATENT DOCUMENTS

| | | |
|---|---|---|
| JP | 2004-020017 | 1/2004 |
| WO | WO-2006/047386 A3 | 5/2006 |
| WO | WO-2006/089400 A1 | 8/2006 |

OTHER PUBLICATIONS

Liquimud Plus Liquid Drilling Fluif Polymer, 5 pages, Dec. 18, 2007.

Office Action in China Application No. 201080016655.8, dated Nov. 8, 2013.

Office Action in China Application No. 201080016655.8, dated Feb. 22, 2013.

Office Action in New Zealand Application No. 595561, dated Oct. 30, 2013.

Office Action in New Zealand Application No. 595561, dated Sep. 27, 2012.

Office Action in Russian Application 2011139215/06(058572) based on PCT/GB2010/050406, issued Apr. 1, 2014.

English translation of Office Action in Russian Application 2011139215/06(058572) based on PCT/GB2010/050406, issued Apr. 1, 2014.

Notice of Rejection in Japanese patent application 2011-553524, dated Feb. 10, 2014.

English Summary of Notice of Rejection in Japanese patent application 2011-553524, dated Feb. 10, 2014.

English computer translation of Japanese Publication 2004-020017.

* cited by examiner

PERCUSSION MOLE AND METHOD OF GEOTHERMAL HEAT EXCHANGE

This invention relates to a method and apparatus for laying underground pipework. It is particularly relevant in the case that the pipes form a part of a heating or cooling system using a heat pump—that is, a geothermal, or ground-source, heat-pump system.

Heat-pump based heating systems are becoming more popular as a means of heating. They work by extracting heat energy from the ground, concentrating it and redirecting it—for example, to heat a building or other space. It is also possible to configure the system to act in reverse, whereby heat is extracted from a building and conducted to the ground. In either configuration, heat energy is transferred between the ground and the pump system via a thermally-conductive loop of pipe laid in the ground. The pipe contains a fluid, which is circulated by a pump to transfer heat energy around the system. In a typical closed-loop system, the fluid is a solution of water and antifreeze.

The thermally-conductive pipework may be laid in the ground in a variety of arrangements depending on factors, including site-access, ground-type, proximity of buildings, or site boundaries. The pipes may be installed such that they are substantially horizontal, in which case they may be laid in open trenches that are subsequently filled in. Alternatively, the pipes may be placed in holes in the ground produced by conventional percussion-moling or drilling techniques. In this case, access to the distant end of the hole can be achieved, for example, by means of a pit into which the hole emerges. It is often desirable—for example, to keep within a restrictive site boundary—to place the pipes in holes which are not horizontal and instead project downwards at an angle (in some cases vertically downwards). These holes may be very deep, exceeding 100 meters or more, and are typically produced by drilling techniques involving expensive and cumbersome equipment that must be located at the point of entry, at ground-level. Clearly, in this case, access to the other end of the hole is impossible; therefore, after the hole has been prepared, a pair of pipes joined at their end by a compact 180 degree coupling is inserted in the hole, such that in the completed heating system, fluid may be circulated down into the hole and back again.

Methods currently employed to create holes where there is no far-end access require the use of expensive and cumbersome drilling and boring machines. Often, the expense is prohibitive or access for drilling machinery is impossible. By way of example: condensed urban locations may have little or no access to the exposed ground around a site to be heated or may have no external ground at all, such that the only practical solution is to enter the ground from within the building itself (for example, through a cellar floor). Additionally, certain ground conditions can result in the partial collapse of the drilled hole after removal of the drilling equipment, so that insertion of the pipework loop is difficult or impossible. It is usual for the drilling process to simultaneously sleeve the hole bore to prevent such collapse. However, subsequent installation of the heat transfer pipes leaves them in a void that must be filled with a thermally conductive caulking if the system is to operate with expected efficiency.

Percussion moles (also known as impact moles, or soil-displacement hammers) are pneumatically driven devices that can be used in instances where it is required to lay a pipe or cable underground, without first digging a trench. Most commonly used to pass horizontally beneath a roadway or similar obstruction, the percussion mole is usually placed in the side of a pit and aimed at a distant pit of similar depth where it is intended to emerge. The mole is driven by compressed air, provided along a rear-mounted compressed air hose. An internal piston having significant mass is caused to travel rapidly forwards within the tubular casing of the mole, where it strikes the forward end of the casing, driving the casing forwards, displacing the ground around the casing in the process. Internal valves are arranged so that, having struck the forward position within the casing, the piston is driven back to the rear of the casing with less energy, at which point its travel is arrested. The exhaust air is then vented into the cavity behind the mole and the cycle is repeated. Energy dissipated during rearward travel of the internal piston and its subsequent reversal is insufficient to overcome the friction between the casing and the ground compressed around it; therefore, the casing does not travel backwards during this part of the cycle. There are more sophisticated types of mole that are capable of being steered underground and also types that may be commanded to travel backwards if, for example, an irresistible obstruction is encountered. Conventional moles, including simple and the latter described sophisticated types, are generally designed for reasonable longevity during which many separate cable installations will be performed. In all applications it is anticipated that the mole will be recovered after achieving its purpose of creating a cavity through which the cable or pipe may be passed. In some cases, the mole is used to pull the cable or pipe through at the same time as the mole creates the cavity.

According to a first aspect of the invention, there is provided an apparatus for inserting a ground-loop for a geothermal heat-pump system, comprising: a percussion mole; a first fluid pipe, connected to the mole, for conveying a heat-exchange fluid from the heat-pump system into the ground; and a second fluid pipe, connected to the mole, for returning the heat-exchange fluid to the heat-pump system, wherein one of the first and second fluid pipes comprises an intake pipe for delivering a driving fluid to the mole during insertion of the ground-loop and the other fluid pipe comprises an exhaust pipe for the driving fluid.

The driving fluid is a pressurised fluid which delivers the motive power for the percussion mole. It may be a hydraulic fluid (that is, a liquid) or, in the case of a pneumatically driven mole, a gas such as compressed air.

This apparatus provides a low cost means of inserting a closed loop of pipe that may be used in very confined locations. It comprises a sacrificial (disposable) percussion mole to create a blind-ended passage for installation of a closed loop of pipework for use in a heat pump system. The loop of pipework is comprised of the first and second fluid pipes, and these are pulled by the mole as it penetrates into the ground. Thus, the mole creates the hole and inserts the pipe loop as it is doing so. In this way, the two operations of drilling or moling the hole and inserting the pipe are carried out concurrently. As well as the advantages of speed and convenience, this may avoid the problem of the walls of the hole partially collapsing after it has been drilled or moled, but before the pipe can be inserted. Similarly, it may eliminate the need to line the hole with a sleeve to prevent collapse. In turn, therefore, the invention may also eliminate the need for the conventional step of filling a void around the pipes, inside the sleeve, with thermally conductive caulking. Furthermore, the mole can be of a compact and light-weight construction, since it is required for only a single use. The moling apparatus of the invention can be used when there is limited access, at least in part because there is no need to retrieve the mole after each hole is created. Instead, a new mole is used for each hole. Although this results in multiple moles being abandoned in situ, the simple construction of a single-use mole can mean that the total cost of an installation is dramatically reduced, compared with traditional excavation methods.

The first or second heat-exchange fluid pipe also comprises the pipe for delivering the driving fluid, which simplifies the construction of the moling apparatus, by reducing the number of pipes or tubes which are connected to the mole. This also saves on the cost of materials—all lengths of pipe attached to the mole will be left in the ground, since it is intended that no part of the apparatus be retrieved. Therefore, it is advantageous to keep the apparatus as simple and cheap as possible. During insertion, at least one of the first and second fluid pipes is used to deliver the compressed air (or other driving fluid) that drives the mole. After insertion, the driving fluid supply is disconnected, and the first and second fluid pipes are connected to the heat pump system, ready for normal use.

The other pipe (that is, the remaining one of the two fluid pipes, which is not delivering driving fluid) comprises an exhaust pipe for the driving fluid.

It is known for compressed air to be expelled from a pneumatic mole and vented into the soil. It can be beneficial, however, to return this exhaust gas to the surface, to avoid potential disturbance to the walls of the hole and the surrounding earth. It is also the case that for the mole to operate correctly a pressure difference must exist between the air input and exhaust. With conventional moles, if venting of the exhaust is inhibited by total or partial collapse of the hole behind the mole or by groundwater pressure, then operation of the mole is impaired, sometimes even to the state where it fails to operate at all. Furthermore, the exhaust gas of a pneumatic mole may contain lubricants or other contaminants, which could be detrimental to the environment. According to the invention, the exhaust compressed air is returned to the surface via one of the first and second fluid pipes. This avoids the difficulties associated with an underground exhaust. It also makes it possible to drive the mole hydraulically. Hydraulic fluid usually cannot be vented into surrounding soil, so a closed return path is practically essential. Note that, because one of the first and second heat-exchange fluid pipes is used for delivery of the driving fluid and the other is used as an exhaust for the driving fluid, during the insertion process, the number of pipes or tubes which need to be connected to the mole is minimised.

Because the driving fluid is received through one of the two heat-exchange fluid pipes and exhausted through the other, the mole itself can optionally be hermetically sealed (except for these two ports). This means that there is no possibility for leakage of fluids out of the mole, or ingress of groundwater into it.

The percussion mole may have a first configuration in which it is adapted to receive driving fluid and drive the pipes into the ground, and a second configuration in which it is adapted to receive the heat-exchange fluid via the first fluid pipe and return the fluid via the second fluid pipe.

In the first configuration, the mole is adapted for the insertion process, wherein the driving fluid delivered via the first or second fluid pipes powers the mole to drive it into the ground. The mole is then switched to the second configuration, in which the first and second fluid pipes form a loop for the heat-exchange fluid of the heat-pump system. The apparatus may comprise a valve assembly, which provides these two configurations along with some means to control the switch over from the first to the second.

In the second configuration the mole is preferably isolated from the heat exchange fluid. That is, the flow-path of the heat-exchange fluid in the second configuration is diverted, compared with the path of the driving fluid in the first configuration. This may be particularly desirable if the heat-exchange fluid would be corrosive to the materials used to construct the mole. It can also achieve better isolation of the heat-exchange fluid, in the long term. This can mean both that the heat-exchange fluid does not leak into the surrounding soil and that groundwater pressure does not cause leakage into the geothermal heating circuit.

According to a second aspect of the invention, there is provided a valve assembly for a percussion mole for inserting a ground-loop for a geothermal heat-pump system, comprising: a heat-exchange fluid entry port, for receiving a heat-exchange fluid from the heat-pump system; and a heat-exchange fluid exit port, for returning the heat-exchange fluid to the heat-pump system, wherein one of the heat-exchange fluid entry port and the heat-exchange fluid exit port comprises a driving-fluid entry port, for receiving a driving fluid for pneumatically driving the mole and the other port comprises an exit port for the driving fluid, wherein the valve has a first configuration in which it is adapted to receive driving fluid and communicate it to the mole, and a second configuration in which it is adapted to receive the heat-exchange fluid via the heat-exchange fluid entry port and return said fluid via the heat-exchange fluid exit port.

The valve assembly may be attached to a mole at one side and to a plurality of pipes at the other side, to provide a complete moling apparatus according to the present invention. In the first configuration, the valve provides for the pneumatically or hydraulically driven insertion of the mole. In the second configuration, the valve provides a loop for receiving and returning heat-exchange fluid from and to the heat-pump system, respectively.

The heat-exchange fluid entry port or the heat-exchange fluid exit port comprises the driving fluid entry port.

This reduces the number of ports and thus can reduce the complexity of the valve. Moreover, it corresponds to a reduction in the number of pipes which must be connected to the mole, via the valve.

The other port (among the heat-exchange fluid entry port and the heat-exchange fluid exit port) comprises an exit port for the driving fluid.

This reduces the number of pipes connected to the valve (and therefore to the mole), while at the same time providing a return path for the driving fluid used to drive the mole. This may in turn facilitate improved heat exchange between the pipes of the ground-loop and the surrounding earth, when the heat pump system is in use. Pipes remaining in the ground that were used for the installation but play no part in the circulatory system will reduce thermal conductivity of the fluid pipes from the ground.

The valve may be adapted to switch irreversibly from the first configuration to the second configuration in response to the receipt of a body injected into the driving fluid entry port.

This provides one simple and beneficial means for switching the valve from the first to the second configuration. The switching process does not need to be reversed, because the mole is inserted once and, thereafter, will be inactive. Therefore, construction may be simplified by providing an irreversible switching mechanism. The pressurised driving fluid can be used to inject an object, which means that the same force which drives the mole is used to switch the valve from its insertion configuration to its configuration for normal use as part of the heat-pump system. This leads to simplicity of the design, by avoiding a complicated additional control mechanism. The body inserted into the valve may also serve to help isolate the driving arrangement of the mole from the ground-loop of the heat-pump system, once the valve is in its second configuration and the heat-pump system is in use.

The valve assembly may further comprise a spool, wherein the valve is switchable from the first configuration to the second configuration by rotation of the spool.

Such an arrangement is simple, so that it provides reliable operation, and it can also offer a high-quality, permanent seal, to isolate the heat-pump circuit from the surrounding soil and the groundwater in it.

The spool may be rotatable by means of a spring or by means of air pressure, or a combination of both.

The valve preferably provides a smooth U-bend in the second configuration.

By presenting a smooth curve to the flow of heat exchange fluid, the fluid may circulate more easily. This can mean that less power is required to pump the fluid and hence the geothermal heat-pump system is more energy efficient, overall.

The valve assembly may be constructed of non-metallic parts, preferably plastic parts.

A metal valve assembly could corrode after prolonged contact with either the heat-exchange fluid inside the heat-pump circuit or the ground water outside. In contrast, a non-metallic valve should be immune to degradation caused by such environmental conditions. Plastic valve components can also be mass-produced cheaply and reliably. The pipes for the geothermal ground loop will typically be plastic pipes. In this case, the pipes can easily be fused to the valve assembly if the valve assembly is also formed of plastic parts. Polyethylene (PE) is one useful example of a suitable plastic for the pipes and valve assembly.

As an alternative to non-metallic parts, the valve assembly may be constructed of a corrosion-resistant metal or metal alloy, such as stainless steel or gunmetal.

Also provided is apparatus for inserting a ground-loop for a geothermal heat-pump system, comprising the apparatus described above, including a percussion mole and pipes; and the valve assembly described above.

According to a third aspect of the invention, there is provided a method of inserting a ground-loop for a geothermal heat-pump system, using a percussion mole having a first configuration in which it is adapted to receive driving fluid and a second configuration in which it is adapted to receive and return a heat-exchange fluid of the heat-pump system, the method comprising: supplying driving fluid to the mole so as to drive the mole into the ground; and when the mole has been driven a desired distance, switching the mole from the first to the second configuration.

The driving fluid is supplied through a pipe adapted to receive or return heat exchange fluid when the mole is in the second configuration.

Exhaust driving fluid is expelled from the mole through a pipe adapted to receive or return heat exchange fluid when the mole is in the second configuration.

The step of switching the mole from the first configuration to the second configuration may be irreversible and may comprise injecting a body into the mole by the same means used to supply the driving fluid to the mole.

The method may further comprise filling a space around the pipes as the mole is being driven into the ground.

Grouting or caulking the pipes in this way is beneficial for effective heat transfer to or from the surrounding soil, when the heat-pump system is in use.

The space around the pipes may be filled with a granular material.

This can reduce the effect of friction on the pipes as they are dragged into the ground by the mole. If friction is too great, the progress of the mole could stall, or the pipes may stretch, break, or become detached from the mole.

The granular material preferably comprises glass.

Glass has good thermal conductivity properties. Glass granules are also very good at reducing friction, effectively lubricating the insertion of the pipes. Recycled glass granules are available; these can provide an environmentally-friendly, yet effective, way of grouting the pipes.

The invention will now be described, by way of example, with reference to the accompanying drawings, in which.

Figure 1:
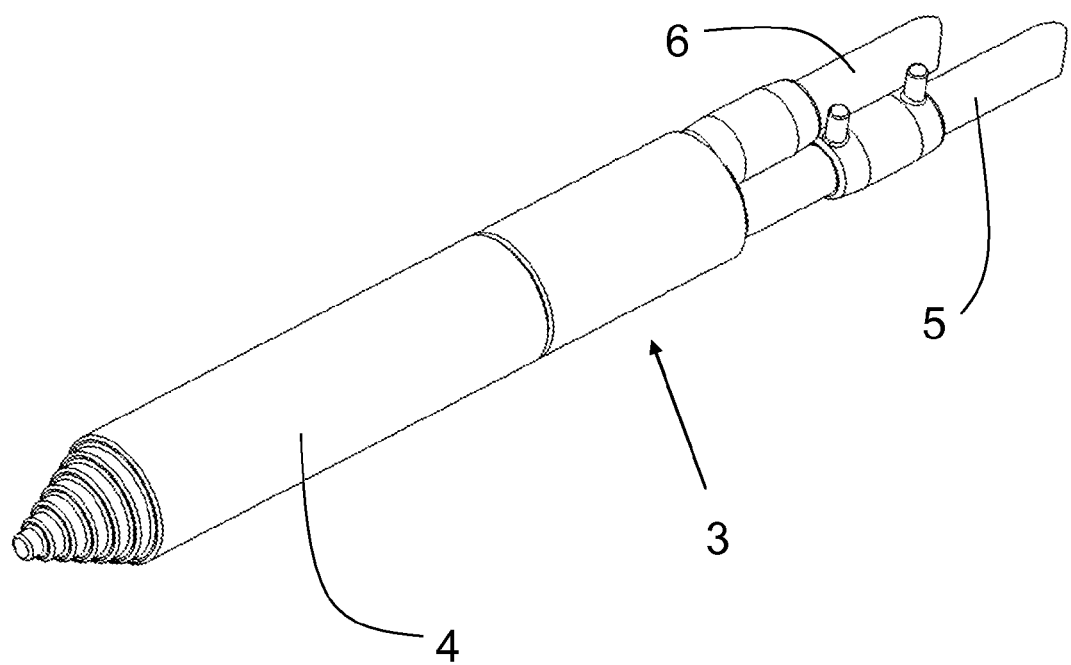
FIG. 1 shows a perspective view of a moling machine with an integrated valve, according to an embodiment of the invention.

It should be noted that these figures are diagrammatic and not necessarily drawn to scale. Relative dimensions and proportions of parts of these figures have been shown exaggerated or reduced in size, for the sake of clarity and convenience in the drawings.

The following example focuses on an exemplary embodiment of the invention, in which the moling apparatus is pneumatic and comprises two pipes—the first pipe is used for delivery of compressed air during insertion and receives heat-exchange fluid during use of the heat-pump system. The second pipe is used as an exhaust for the spent compressed air expelled from the mole, during insertion; and during use of the heat-pump system, it is the return path for the heat-exchange fluid.

The moling apparatus of the exemplary embodiment is shown in FIG. 1. It is fitted with two rear-projecting pipes, 5 and 6, which are of the type commonly used for heat pump systems. The pipes are used initially as a route for providing compressed air to the mole 4 and a route back to the surface for exhaust air from the mole 4. At a determined depth of penetration into the ground, the operator can command a valve 3 at the rear of the mole 4 to change from a first state where the two pipes are connected directly to the mole to a second state where the two pipes are joined to form a continuous loop through 180 degrees and the mole 4 is isolated.

Figure 2:
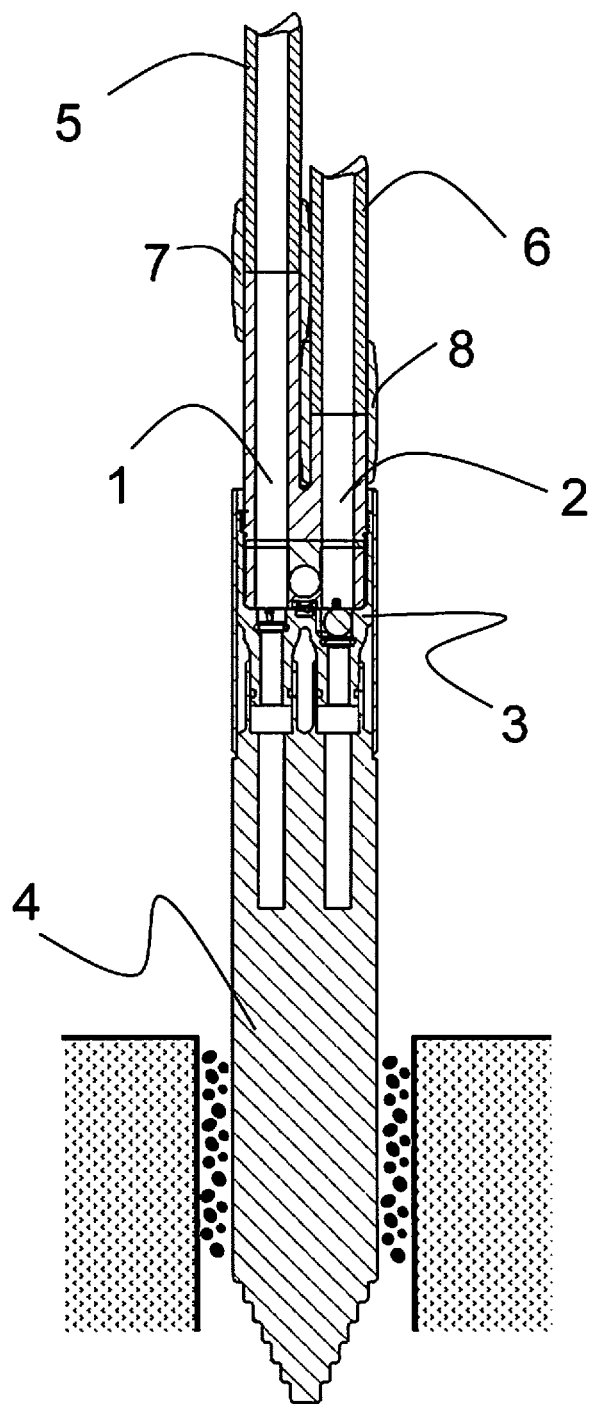
FIG. 2 shows a section view of the moling machine of FIG. 1 with the integrated valve in its first configuration.
Figure 3:
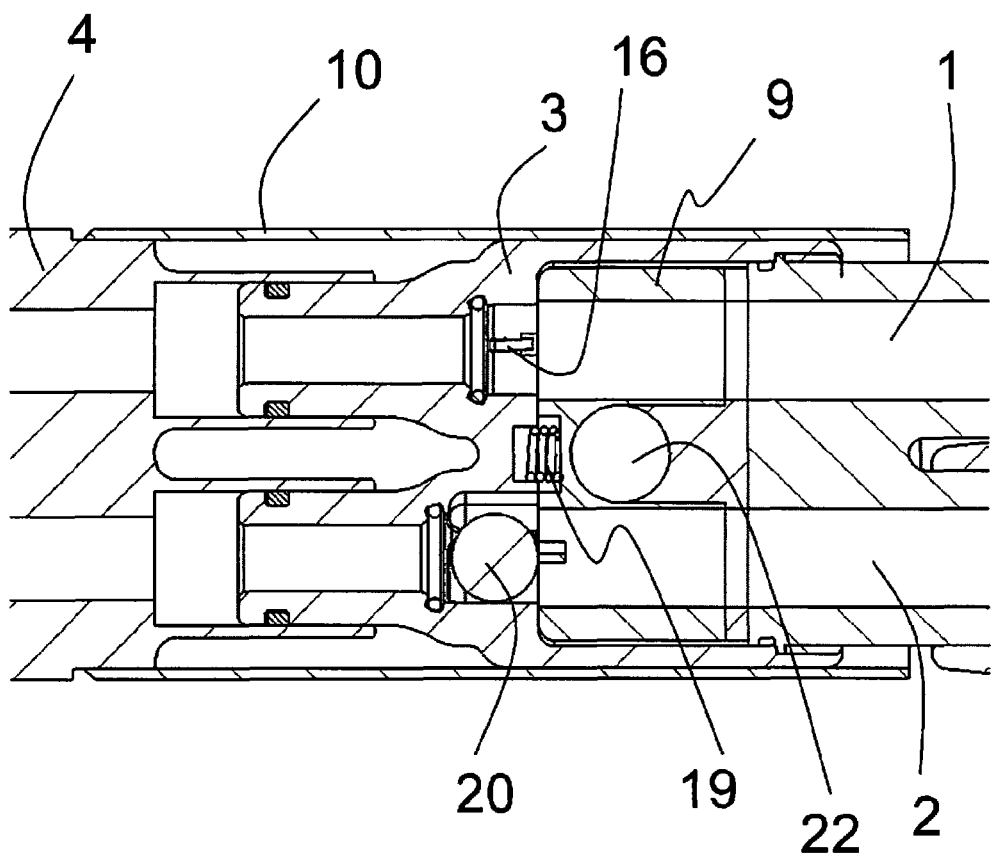
FIG. 3 shows an enlarged section view of the integrated valve in the first configuration.
Figure 4:
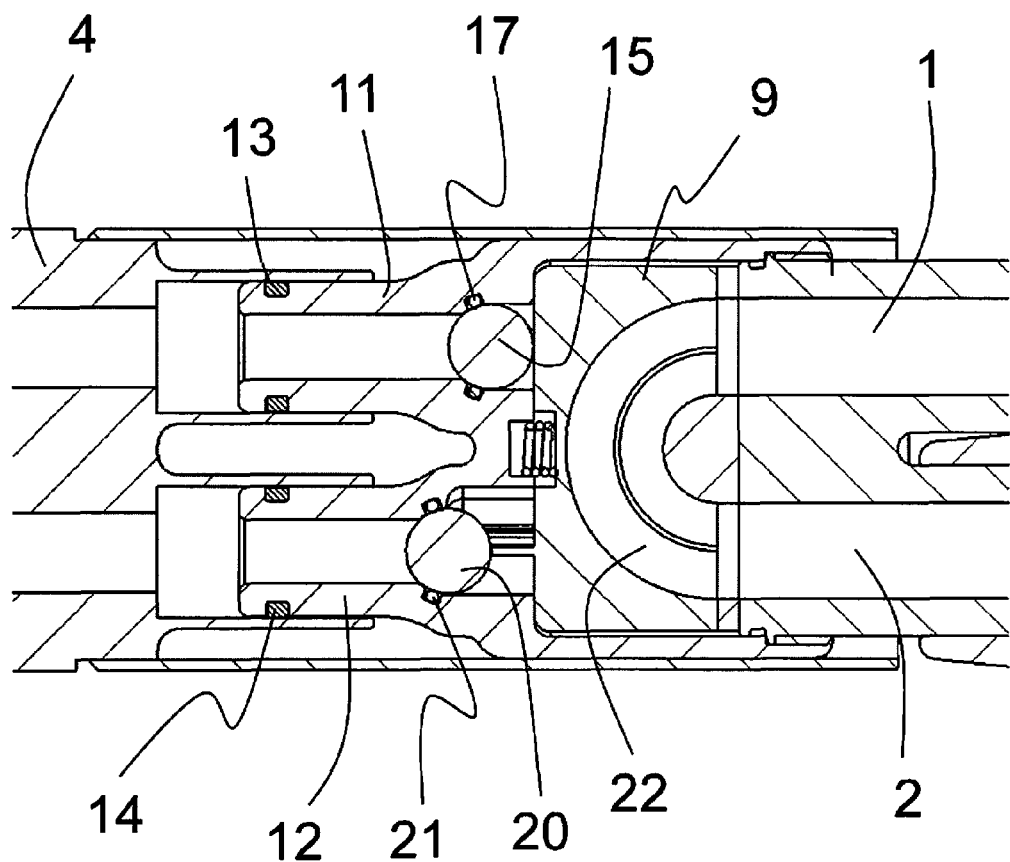
FIG. 4 shows an enlarged section view of the integrated valve in its second configuration.

FIGS. 2 to 4 show an entry port 1 and exit port 2 of a valve body 3 placed behind the mole 4. The main connecting pipes 5 and 6 are fixed to the entry and exit ports using pipe couplings 7 and 8. The couplings could be separate from the valve body (as shown in the drawings of the present embodiment)—for example, the couplings could be of the commonly used thermal fuse type. Alternatively, the couplings could be an integrated part of the valve body itself. A valve spool 9 is contained within the valve body 3. The valve spool 9 is broadly cylindrical with its axis nominally aligned to that of the mole 4. The valve spool is shown in FIGS. 2 and 3 in a first configuration, whereby passage is provided between the entry port 1 and the mole 4 and also the mole 4 and exit port 2. The valve body is protected by a shielding shroud 10, fixed to the mole 4.

The valve body provides two valve configurations: the first configuration (FIG. 3) provides direct passage of high-pressure air from one pipe 5 to the mole and direct passage of exhaust air from the mole to the second pipe 6. The second valve configuration (FIG. 4) provides, when commanded, connection of the two pipes 5, and 6, in the manner of a smooth 180 degree u-bend. This second configuration also provides isolation of the pipes from the mole 4 ahead of the valve 3. Thus when the valve 3 is in the second configuration, the pipes serve to provide substantially the same closed loop of circulation pipework as would be provided by any conventional installation of a geothermal heat-pump system.

The valve transition between the first configuration (wherein air supply is provided to the mole) and the second configuration (wherein the pipework becomes a closed path to and from the surface) must be controlled. In the present embodiment, the valve is caused to switch configuration by the insertion of a body 15 in the compressed-air supply path. When the operator determines that the mole has reached its required depth, the air supply is disconnected and a hard ball 15, smaller than the bore of the pipework, is inserted in the pipe 5. The air supply is then reconnected and the ball will travel, under influence of the air flow (and also gravity, to the extent that the hole has been moled vertically) to the valve inlet. As will be apparent to the skilled person, the system may be used at any angle from horizontal through to vertical. Gravity will obviously play an increasing part depending on the insertion angle. In any case, air flow will drive the ball along the pipe even if installation is horizontal. At the valve inlet, the pipework reduces in diameter to provide passage of the ball but less space for the compressed air to pass around it, so that the ball now acts as a piston. The air pressure behind the ball 15 causes it to push aside a lever 16 projecting into the bore. The ball then comes to rest against a seal 17. The lever 16 causes a spring loaded pin 18 to be pushed back from the recess in which it sits (see FIG. 5), allowing the valve spool 9 to rotate under the influence of a strong torsion spring 19 through 90 degrees to a second position. In this second configuration, the pin 18 again locates in a recess (not shown), locking the valve spool 9 in position. The second position of the spool presents the U-bend pathway 22 to the two entry pipes 5, and 6, thus completing the circulatory route for the heat-exchange fluid.

On reaching its rotational end stop in the second position, the valve spool 9 now biases the ball 15 against its seal 17, ensuring maintenance of good sealing against internal and external pressures. External pressure may be that from ground water outside of the valve.

The exhaust port of the valve has a similar ball 20 captivated within it, such that when the valve is in the first position, the ball is biased by the air exhausting from the mole, to a location where the valve body is widened to allow free air passage around the ball. When the valve is operated (switched) and rotates to the second position, the ball 20 is pushed back down within the valve body by a ramp projecting from the valve spool until it comes into contact with a seal 21 similar to that on the inlet side of the valve. With the ball 20 captivated against the seal by the spool 9, the valve is now completely isolated from the mole and resistant to internal and external pressure.

The mole 4 ahead of the valve 3 is now redundant and not recoverable. As the mole has a finite task to perform in its single use, there is no requirement for longevity and its construction can be simplified to significantly reduce manufacturing cost.

Figure 5:
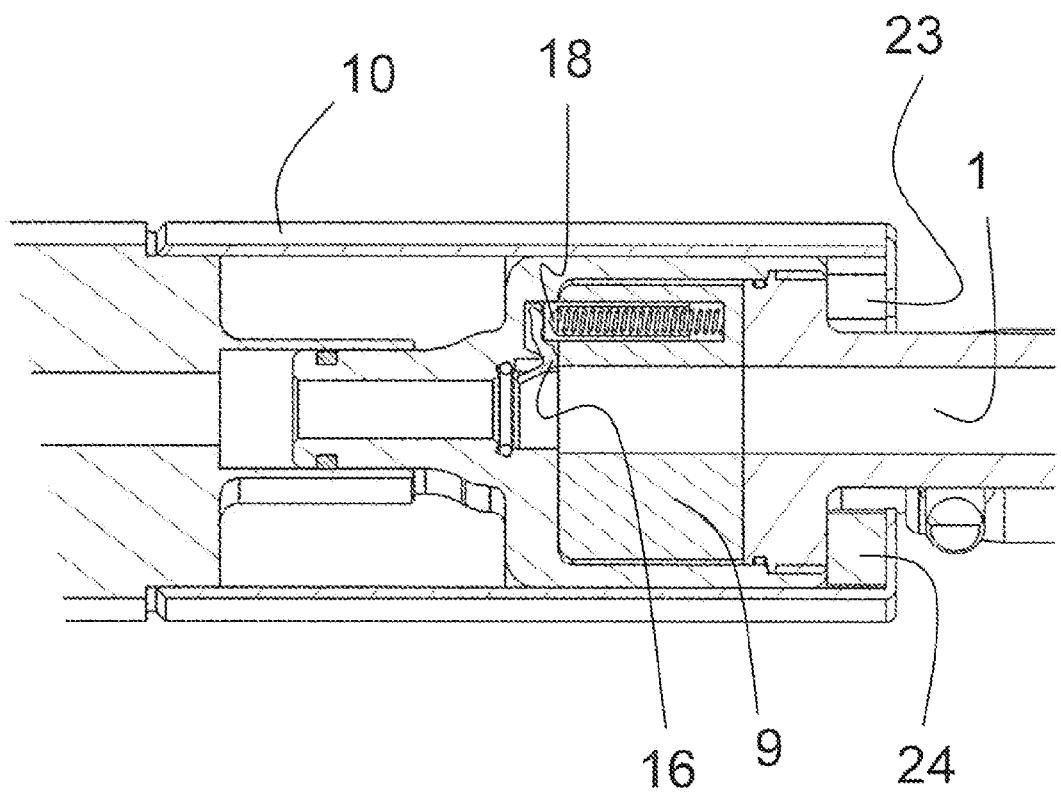
FIG. 5 shows the trigger or release mechanism, for switching from the first to the second configuration, in greater detail.

Preferably, the shroud 10 features two rubber shock absorbers 23 and 24 contacting the rear of the valve body 3, as shown in FIG. 5. The valve body is connected to the mole by two tubes 11 and 12 with O-ring seals 13, and 14, respectively, such that there can be some axial movement. The mole itself moves in short, aggressive steps so the sliding spigots and buffer serve to isolate the valve and trailing semi-rigid pipework.

As the mole is driven into the ground, it pulls the pipes behind it. The surrounding soil exerts a frictional force on the trailing pipes, which opposes the driving force of the mole. The degree of friction will depend on the type of soil into which the ground-loop is being inserted. However, the effect is to hamper the insertion. in the worst case, the pipes may be stretched, pulled off the mole, or otherwise damaged.

In the present embodiment, the effects of friction are reduced by grouting the pipes with a dry granular material as they are inserted. This material is made of grains of recycled glass. The grains reduce the friction between the pipes and the soil. Once the installation is complete, the material acts as a grout or caulk, filling any space around the pipes, and ensuring good thermal conductivity to the soil. During the insertion process, the grains can be poured at the entrance to the hole created by the mole (that is, the point of insertion of the pipes into the ground). Here, they are naturally drawn into the hole as the pipes slide into the ground.

In the present example, the granular material is graded sodium silicate glass sand made from container glass cullet. The glass grains have sizes in the range of 1-2 mm. That is, substantially all the grains will pass through a sieve having 2 mm apertures, while fewer than 5% of the grains will pass through a sieve having 1 mm apertures. Typical thermal conductivity for these glass granules is in the range 1.3-1.5 watts per meter kelvin (W/m K).

Various modifications will be apparent to those skilled in the art. For example, the mole may be hydraulically powered instead of pneumatically powered. If the mole is powered by hydraulic fluid, it will typically be necessary to take additional measures to provide the reciprocating action that drives the mole. Hydraulic fluid, unlike the air in a pneumatic system, is not compressible. In the pneumatic system, the compression of the air provides a degree of resilience that helps to returns the piston to its starting position. If the mole is to be hydraulically powered, this resilience could be provided instead by an enclosed volume of compressible gas, or by a spring inside the casing.

If the percussion mole is pneumatically powered, as those skilled in the art will implicitly understand, references to compressed "air" should be taken to include any gas or mixture of gases.

In the embodiment described above, dry granular material is used to lubricate the insertion of the pipes and to grout them. Alternatively, a liquid can be used for this purpose. It may be beneficial under certain circumstances to use a drilling fluid or drilling mud. For example, liquid drilling fluid polymers comprising anionic acrylamide co-polymer dispersed in a light mineral oil are known in the art of drilling. It may be beneficial to use such products if the angle at which the pipes are being inserted is shallow, because the use of dry granular material depends to some extent on the force of gravity, and this force is lessened at shallow angles. The liquid drilling fluid polymer can be added to water or to a bentonite system.

There will be many different suitable mechanisms for providing the switching mechanism in the valve assembly.

The embodiment described herein and illustrated in the drawings provides a smooth U-bend when the valve of the percussion mole is in its second configuration, in which it connects the two fluid pipes. Likewise, the embodiment describes the use of a rotating spool in the valve to achieve this smooth U-bend. As will be clear to the skilled person, although a smooth U-bend may be advantageous (for example, for improved ease of circulation of the heat-exchange fluid) it is not essential. Equally, a rotating-spool valve is not the only means by which a switch from the first configuration to the second configuration may be achieved.

Similarly, insertion of a ball using the force of the compressed air is one of a variety of mechanisms suitable for switching the valve from its first to its second configuration. For example, activation could also be by means of an incorporated electrical device such as a solenoid, thermal fuse or motor; or by means of a control cable or cord; or even a separate hydraulic connection.

In some embodiments using a rotating spool valve, the internal torsion spring could be eliminated and air pressure used to rotate the spool.

Although geothermal heat-pump systems of the type described are most commonly used to extract heat from a body of earth or water and to heat a building, they can of course be used in other applications. For example, they could be used to heat (or pre-heat) water for domestic use or for a swimming pool. Similarly, they can be used to transport heat between two bodies of earth: for example from soil deeper underground to soil near the surface. This can be useful to protect playing fields against frost, among other purposes. As those skilled in the art will appreciate, the present invention is equally applicable to all these applications.

The invention claimed is:

1. An apparatus for inserting a ground-loop for a geothermal heat-pump system, comprising:
   a percussion mole;
   a first fluid pipe, connected to the mole, for conveying a heat-exchange fluid from the heat-pump system into the ground; and
   a second fluid pipe, connected to the mole, for returning the heat-exchange fluid to the heat-pump system,
   wherein one of the first and second fluid pipes comprises an intake pipe for delivering a driving fluid to the mole during insertion of the ground-loop and
   the other fluid pipe comprises an exhaust pipe for the driving fluid.

2. The apparatus of claim 1, wherein the percussion mole has a first configuration in which it is adapted to receive driving fluid and drive the pipes into the ground, and a second configuration in which it is adapted to receive the heat-exchange fluid via the first fluid pipe and return the fluid via the second fluid pipe.

3. Apparatus for inserting a ground-loop for a geothermal heat-pump system, comprising
   the apparatus of claim 1; and
   a valve assembly for a percussion mole for inserting a ground-loop for a geothermal heat-pump system, comprising:
   a heat-exchange fluid entry port, for receiving a heat-exchange fluid from the heat-pump system; and
   a heat-exchange fluid exit port, for returning the heat-exchange fluid to the heat-pump system,
   wherein one of the heat-exchange fluid entry port and the heat-exchange fluid exit port comprises a driving-fluid entry port, for receiving a driving fluid for driving the mole and
   the other port comprises an exit port for the driving fluid,
   wherein the valve has a first configuration in which it is adapted to receive driving fluid and communicate it to the mole, and a second configuration in which it is adapted to receive the heat-exchange fluid via the heat-exchange fluid entry port and return said fluid via the heat-exchange fluid exit port.

4. A valve assembly for a percussion mole for inserting a ground-loop for a geothermal heat-pump system, comprising:
   a heat-exchange fluid entry port, for receiving a heat-exchange fluid from the heat-pump system; and
   a heat-exchange fluid exit port, for returning the heat-exchange fluid to the heat-pump system,
   wherein one of the heat-exchange fluid entry port and the heat-exchange fluid exit port comprises a driving-fluid entry port, for receiving a driving fluid for driving the mole and
   the other port comprises an exit port for the driving fluid,
   wherein the valve has a first configuration in which it is adapted to receive driving fluid and communicate it to the mole, and a second configuration in which it is adapted to receive the heat-exchange fluid via the heat-exchange fluid entry port and return said fluid via the heat-exchange fluid exit port.

5. The valve assembly of claim 4, wherein the valve is adapted to switch irreversibly from the first configuration to the second configuration in response to the receipt of a body injected into the driving fluid entry port.

6. The valve assembly of claim 4, further comprising a spool, wherein the valve is switchable from the first configuration to the second configuration by rotation of the spool.

7. The valve assembly of claim 6 wherein the spool is rotatable by means of a spring or by means of air pressure.

8. The valve assembly of claim 4, wherein the valve provides a smooth U-bend in the second configuration.

9. The valve assembly of claim 4, wherein the valve is formed of non-metallic parts, preferably plastic parts.

10. A method of inserting a ground-loop for a geothermal heat-pump system, using a percussion mole having a first configuration in which it is adapted to receive a driving fluid and a second configuration in which it is adapted to receive and return a heat-exchange fluid of the heat-pump system, the method comprising:
    supplying driving fluid to the mole so as to drive the mole into the ground; and
    when the mole has been driven a desired distance, switching the mole from the first to the second configuration,
    wherein the driving fluid is supplied through a first of two pipes, wherein the first pipe is also for receiving heat exchange fluid and a second of the two pipes is for returning heat exchange fluid when the mole is in the second configuration, and exhaust driving fluid is expelled from the mole through the second of said two pipes.

11. The method of claim 10 wherein the step of switching the mole from the first configuration to the second configuration is irreversible and comprises injecting a body into the mole by the same means used to supply the driving fluid to the mole.

12. The method of claim 10, further comprising filling a space around the pipes as the mole is being driven into the ground.

13. The method of claim 12, wherein the space is filled with a granular material.

14. The method of claim 13, wherein the granular material comprises glass.

* * * * *